United States Patent [19]

Anonychuk

[11] Patent Number: 5,683,478
[45] Date of Patent: Nov. 4, 1997

[54] OCCUPANT AIR FILTER FOR VEHICLES

[76] Inventor: Lawrence Anonychuk, 60 Glenaden Ave. E., Toronto, Ontario, Canada, M8Y-2L3

[21] Appl. No.: 551,949

[22] Filed: Nov. 2, 1995

Related U.S. Application Data

[63] Continuation-in-part of Ser. No. 283,420, Aug. 1, 1994, abandoned.

[51] Int. Cl.$^6$ .................................................. B01D 46/52
[52] U.S. Cl. .......................... 55/385.3; 55/482; 55/498; 55/502; 55/507; 454/158
[58] Field of Search ........................ 55/385.3, 498, 55/502, 503, 504, 505, 507, 511, 494, 478, 482, DIG. 31; 454/158; 95/273

[56] References Cited

U.S. PATENT DOCUMENTS

| | | | |
|---|---|---|---|
| 1,542,529 | 6/1925 | Runback | 55/486 |
| 2,677,436 | 6/1954 | Mazek | 55/DIG. 31 |
| 2,835,183 | 5/1958 | Miller et al. | 454/158 |
| 2,988,169 | 6/1961 | Klein | 55/502 |
| 3,406,501 | 10/1968 | Watkins | 96/135 |
| 3,552,103 | 1/1971 | Smith | 55/502 |
| 3,702,049 | 11/1972 | Morris, Jr. | 55/278 |
| 3,796,027 | 3/1974 | Gumtow | 55/502 |
| 3,959,891 | 6/1976 | Burkall | 34/82 |
| 4,045,350 | 8/1977 | Kupf et al. | 55/507 |
| 4,074,985 | 2/1978 | Willas | 55/498 |
| 4,099,944 | 7/1978 | Davis | 55/501 |
| 4,250,172 | 2/1981 | Mutzenberg et al. | 428/234 |
| 4,261,717 | 4/1981 | Belore et al. | 55/419 |
| 4,291,904 | 9/1981 | Iverson et al. | 55/502 |
| 4,303,426 | 12/1981 | Battis | 55/498 |
| 4,319,519 | 3/1982 | Parsson | 454/158 |
| 4,320,755 | 3/1982 | Flint et al. | 128/205.12 |
| 4,361,427 | 11/1982 | Barradas | 55/279 |
| 4,610,703 | 9/1986 | Kowalczyk | 55/274 |
| 4,610,705 | 9/1986 | Samosky et al. | 96/135 |
| 4,626,265 | 12/1986 | Adiletta | 55/316 |
| 4,702,753 | 10/1987 | Kowalczyk | 96/138 |
| 4,725,296 | 2/1988 | Kurotobi | 55/497 |
| 4,826,517 | 5/1989 | Norman | 55/502 |
| 4,861,359 | 8/1989 | Tettman | 55/419 |
| 4,963,166 | 10/1990 | Hoyt et al. | 55/316 |
| 5,004,487 | 4/1991 | Kowalczyk | 96/127 |
| 5,050,487 | 9/1991 | Arold et al. | 55/502 |
| 5,192,346 | 3/1993 | Kowalczyk | 55/269 |
| 5,342,423 | 8/1994 | Taft | 55/511 |
| 5,350,443 | 9/1994 | von Blücher et al. | 96/135 |
| 5,350,444 | 9/1994 | Gould et al. | 55/511 |
| 5,368,621 | 11/1994 | Pool | 55/498 |
| 5,472,379 | 12/1995 | Andress et al. | 55/507 |

FOREIGN PATENT DOCUMENTS

| | | | |
|---|---|---|---|
| 26 20 148 | 12/1976 | Germany . | |
| 3512422 | 10/1986 | Germany | 454/158 |
| 35 16 113 | 11/1986 | Germany . | |
| 63-20214 | 1/1988 | Japan | 454/158 |
| 2083012 | 3/1990 | Japan . | |

*Primary Examiner*—Jay H. Woo
*Assistant Examiner*—Duane S. Smith

[57] ABSTRACT

An air filter device to filter fresh air for occupants of a vehicle is disclosed. The device includes a generally circular bottom base unit including a perimeter mounting portion to retain said device in an air conduit. The perimeter mounting portion includes a pair of mounting lips separated by an outwardly extending mounting groove. The lips resiliently flex over a rim formed in the vehicle to position the device in place. Extending from the base unit is an air filter which is sized and shaped to fit into a cavity located within a blower motor assembly. In this manner the device can be retrofit into a standard vehicle to provide air filtration without requiring extensive modification of the ducting and the like.

22 Claims, 6 Drawing Sheets

OCCUPANT AIR FILTER FOR VEHICLES

This is a Continuation in Part of 08/283,420, filed Aug. 1, 1994 now abandoned.

FIELD OF THE INVENTION

This invention relates generally to the field of air filters, and in particular to air filters which may be used to filter air being drawn into a closed space, such as the inside of a vehicle.

BACKGROUND OF THE INVENTION

Modern vehicles are built to withstand the extremes of climate. Therefore, the human occupied portion of the vehicle tends to be a closed space which can be heated, or cooled, to an appropriate temperature for any human occupants. Being a closed space, however, requires that fresh air be provided to the interior.

Most vehicles, therefore, are provided with a fresh air intake conduit which allows fresh air from the outside to be passed into the interior of the vehicles. The majority of vehicles are equipped with a turbine fan blower air circulation system. This is widely used in both older and new vehicles. However, the so called "fresh air" from the outside is not fresh at all. For example, in a traffic jam, with a large number of vehicles producing fumes, the fresh air in-take of one vehicle may be simply taking in the fumes of a vehicle in front or at the side of it. This is especially true in urban and congested areas where overall air pollution is a serious problem.

In the past, this has been dealt with by the use of integrally built air filter conduit systems which are intended to be made part of the car. Ford's 1995 Mercury Mystique model has incorporated an occupant air filter, by redesigning the air circulation conduits to accept such a filter. In addition to Ford's design, for example, U.S. Pat. No. 5,192,346 to Kowalczyk shows a specialized conduit containing an air filter, which is inserted into the vehicle's air system between the fresh air inlet and the inside of the vehicle. However, this design is one that needs to be installed in the factory, and additionally requires a heater to keep the filter functioning correctly. Such a device is awkward, expensive to build and install, and generally impractical.

SUMMARY OF THE INVENTION

What is required, therefore, is a device which can easily and efficiently filter the fresh air intake into a vehicle's air system. Preferably such device would be easy to build and install. Also, such a device would preferably be able to be used in a number of different vehicles from different manufacturers, and yet would provide consistent results. Such an occupant air filter could be retrofit into existing vehicles, without the need for modifications to the ducts, conduits or plenums and would apply to turbine fan blowers. Further, the device should be replaceable, in the event it becomes clogged with dirt or pollutants. Thus as well as being easy to insert into a standard vehicle, it should also be easy to demount.

Therefore, according to the present invention there is provided an air filtering device for inserting into a fresh air turbine fan intake conduit for occupants of a vehicle, where the conduit includes a generally circular rim extending around the lower perimeter of the conduit from an inside face of said conduit, said air filter device comprising:

a generally circular bottom base unit, said bottom base unit including a perimeter mounting portion to allow said bottom base unit to be retained in said air conduit, said perimeter mounting portion comprised of opposed outwardly extending mounting lips separate by a outwardly opening mounting groove, said mounting lips being resiliently flexible to mount over said rim and sufficiently stiff to retain said air filtering device in position on said rim.

said bottom base unit including air filter mounting means, and an air filter retained in said air filter mounting means of said bottom base unit, said air filter being sized and shaped to be inserted into a cavity located within a blower;

wherein said device is mountable in standard air circulation ducting of a vehicle by retaining said generally circular rim in said mounting groove without the need to modify said air circulation ducting.

BRIEF DESCRIPTION OF THE DRAWINGS

Reference will now be made to drawings of the invention, by way of example only, which illustrate preferred embodiments of the invention and in which.

DETAILED DESCRIPTION OF THE PREFERRED EMBODIMENTS

Figure 1:
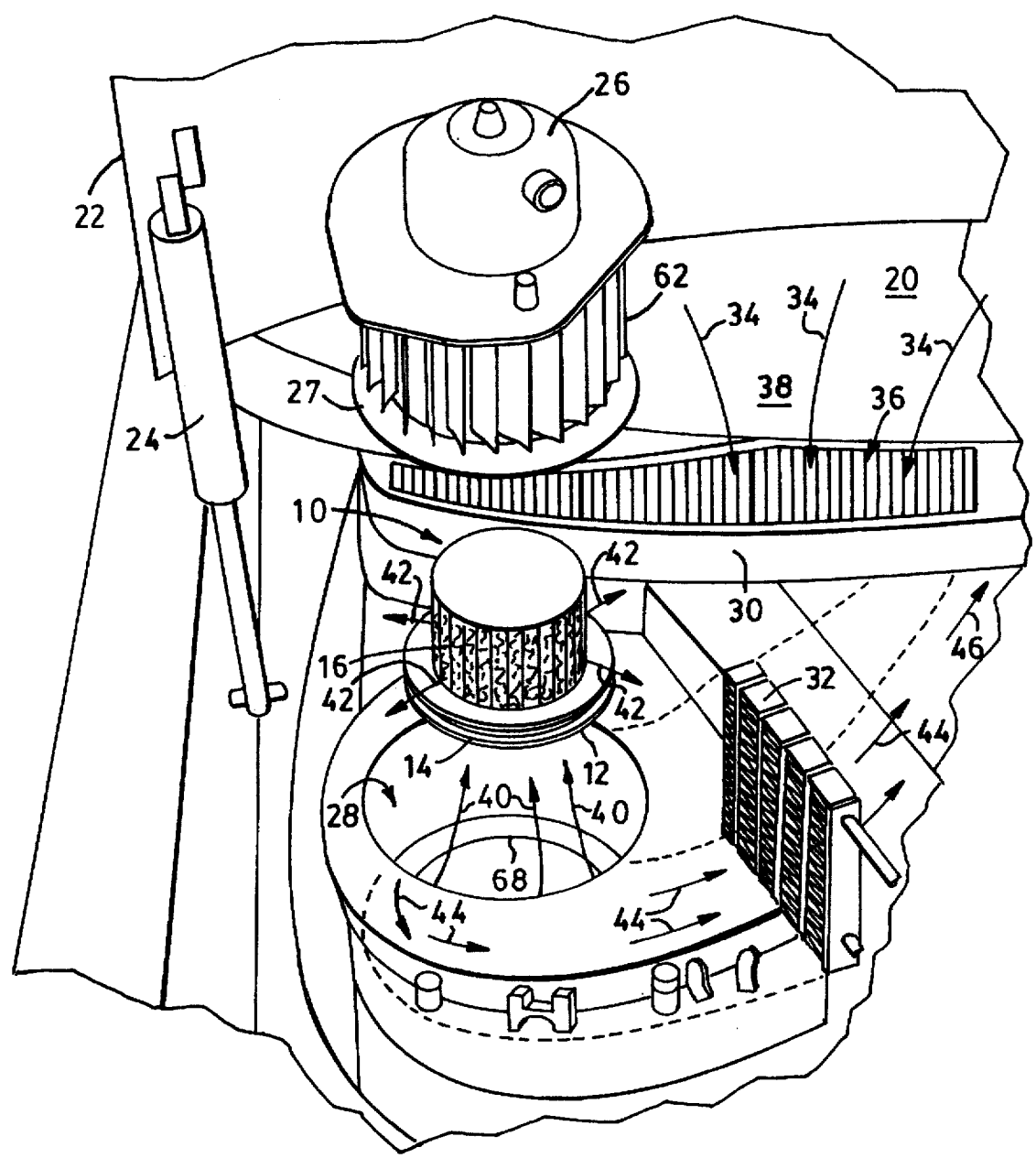
FIG. 1 is a front view under the hood of a vehicle including an air filtering device according to the present invention.

An air filtering device is shown generally as 10 in FIG. 1. The air filtering device includes a bottom base unit, shown generally as 12 which includes a perimeter mounting flange 14 and an air filter 16 which is retained in the bottom base unit 12. These elements are described in further detail below.

Also shown in FIG. 1 is a vehicle indicated generally as 20 which includes a hood 22 and a hood support cylinder 24. A blower motor assembly 26 is shown in exploded view above the air filtering device 10. The blower motor assembly 26 fits into a cavity 28 in the air circulation system of the vehicle 20. The air circulation system includes a cowl 30 which directs air past the blower 26, driving a fan 27, then a air condition core (or heat exchanger) 32 and then through conduits and into an interior portion of the vehicle 20.

The flow of air into the vehicle is shown by a number of arrows. Beginning with arrows 34, the air is taken in through an air intake screen 36 adjacent to the windshield 38. From there the air is drawn into the conduit system and into cavity 28 as shown by arrows 40. Arrows 42 show the air passing through air filtering device 10 and arrows 44 then show the air passing past the air conditioner core 32. From there the air (as shown by arrows 46) enters the interior of the vehicle.

Figure 2:
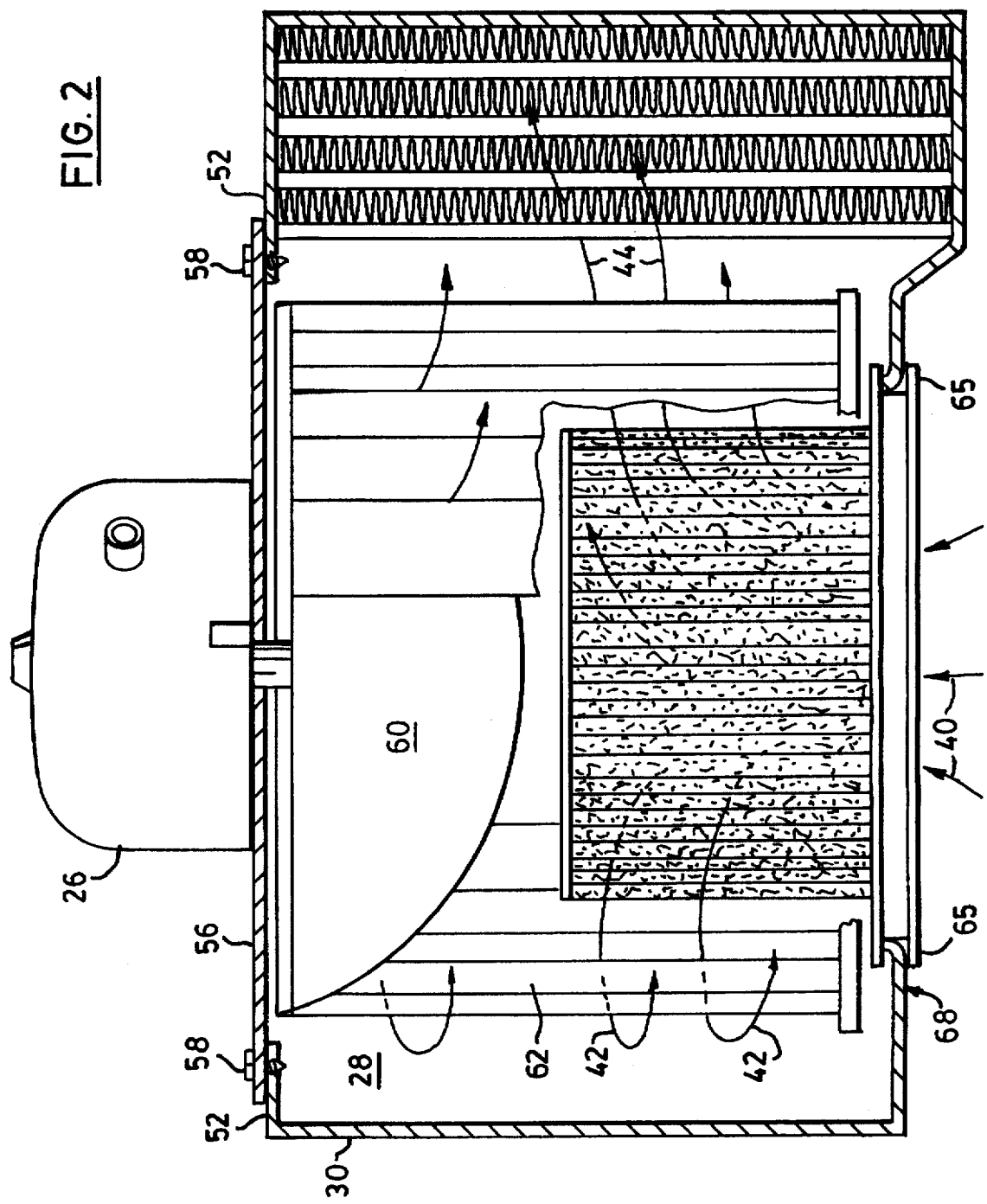
FIG. 2 is a side view of the blower motor assembly showing the air filtering device of FIG. 1.

Turning to FIG. 2, a side view in part section is shown of the air filtering device 10 according to the present invention.

It will be noted that the cavity 28 is defined by the cowl or shield 30 which includes a top leg 52. The blower motor assembly 26 is mounted in a plate 56 which is then screwed into a top leg 52 by means of screws, bolts or the like shown as 58. A portion of the blower motor assembly 26 extends beneath the top plate and is shown as 60. There is also included a turbine fan 62 which rotates upon the blower motor assembly 26 being activated.

It can now be appreciated that the air filtering device 10 of the present invention is sized and shaped to fit into the cavity 28 within the interior of the turbine fan 62 as shown in FIG. 2.

Figure 3:
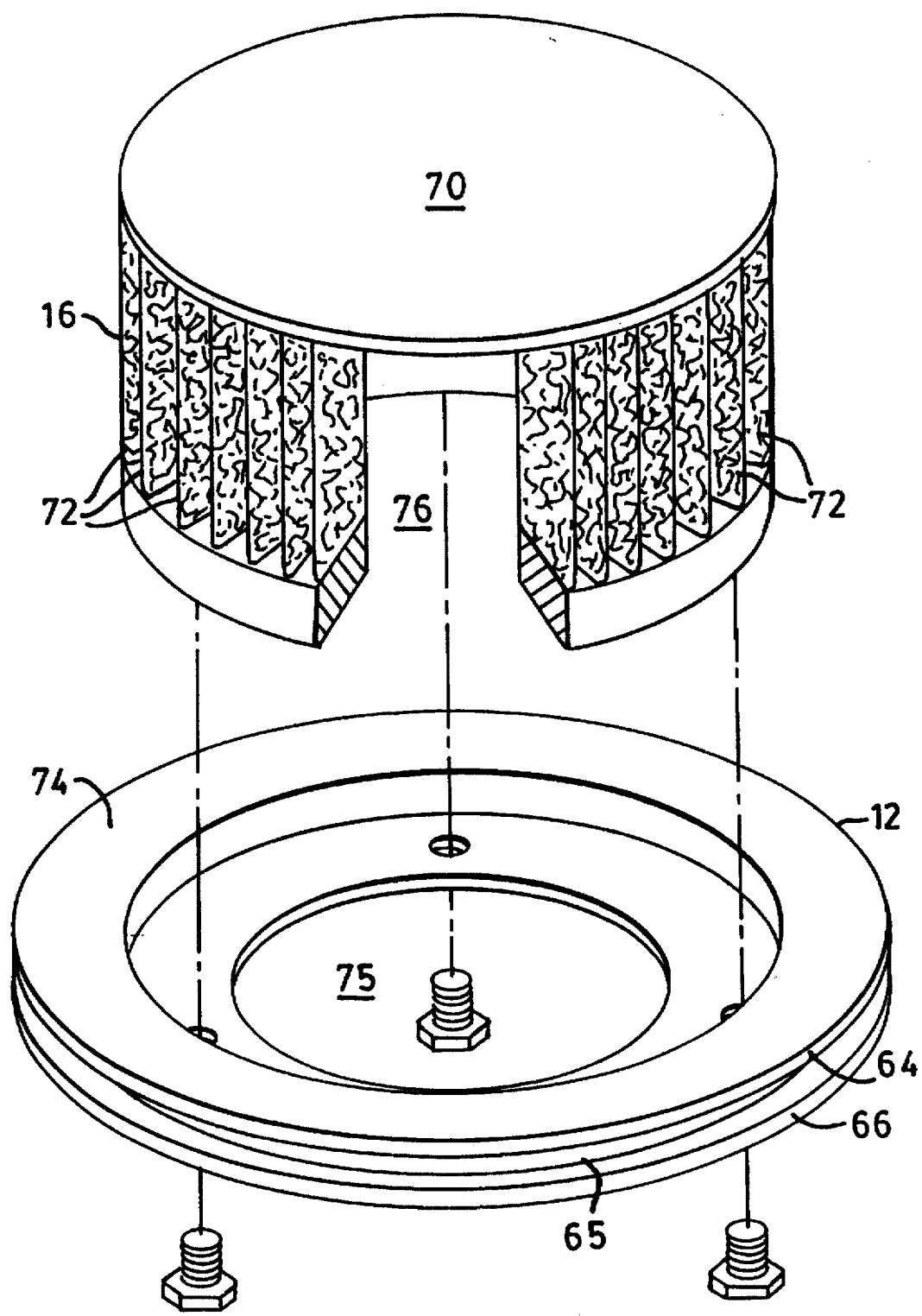
FIG. 3 is an exploded part section view of the air filtering device of FIGS. 1 and 2.

Turning to FIG. 3, the bottom base unit 12 is preferably circular in plan view, and has several important functions. Firstly, it provides a place to mount the outwardly extending lips 64, 66, described below. The bottom base unit 12 of the air filtering device 10 includes a pair of lips shown as 64 and 66. The lips 64, 66 extend outwardly from the perimeter, and serve the dual function of being stiff enough to lock the device 10 in place, and being flexible enough to permit the device 10 to be mounted or demounted.

The preferred material is a rubber or plastic compound with a derrometer rating of 55D to 92D, with the most preferred being 72D plus about or minus 10D. HYTREL plastic (trade mark of Du Pont) is a suitable material. The preferred lip thickness is about 1.2 mm. Between the two is accommodated (in the installed position), a slightly upturned edge or rim 68 formed in the ventilation system in a mounting groove 65 (see FIG. 2). It has been observed that most automobiles include the upturned rim 68 below the fan 62 and that in many cases, the upturned edge is of similar overall dimension for different makes of vehicles. In some cases, rim 68 is not upturned, but is flat. The interaction between the rim 68 and the mounting lips 64, 66 is described in more detail below. Preferably the mounting lips 64, 66 are made from a relatively stiff, yet flexible material such as rubber, plastic (HYTREL) or the like. While groove 65 is shown as rectangular, other shapes may also be used. Also, while the depth of the groove 65 is shown as being more than the thickness at the lips 64, 66, this can also be varied. What is desired is opposed mounting lips or flanges, which can resiliently deform to overcome obstacles, and yet which are capable of forming a good seal and a secure fit into and against the rim 68.

As can be seen in FIG. 3, the air filtering device 10 of the present invention includes the air filter 16 which is in the form of a sheet formed into a plurality of pleats 72. A top face 70 is formed on the air filter device which while it may also be a filter material, it is preferred to be made from an impervious material. This causes the air to pass through the sides or pleats 72 of the air filter 16. As can be seen, pleats 72 extend between the top 70 and an elastomeric foundation or foot 74. Both the top and the elastomeric foundation or foot are useful to give the pleated filter dimensional stability and to facilitate the attachment of the air filter 16 into the bottom base unit 12. As can be seen, there is a central opening or air intake inlet 75 in the lower portion of the air filter which allows air to pass up into the interior 76. From there, it is drawn by the turbine fan 62 through the air filter pleats 72 and on through the ventilation system.

The vertical faces of the filter are desirable, in that during the constant vibration present in moving vehicles, there will be a tendency for the filtrate to become dislodged and fall off the filter face, provided the blower is turned off or, is operating at low speeds. This natural action will help reduce excess pressure drops across the filter from occurring by reason of the filter pores being plugged.

It will be appreciated by those skilled in the art that the choice of appropriate filter materials will depend upon the air flow. Too much filtering will cause too great a pressure drop, and will impede the circulation of fresh air and oxygen into the passenger compartment. Too little filtering will allow the unpleasant pollution to enter the vehicle. What is required is a suitable balance which allows enough fresh air, without much pollution. Ideally, the filter material should not impede air flow too much. Excessive wear on the blower could result if the air flow is restricted too much or, the occupants could suffer from a lack of fresh air. The preferred form of the air filter material is a charcoal impregnated, electrostatically charged filter paper media.

An example of suitable filter material is described in U.S. Pat. No. 5,350,443 to Von Blucher et al. This material is suitable, because it could be durably folded with a hot knife. It is also quite air permeable which puts less strain on the blower motor and improves downstream circulation. It will also be effective in removing unpleasant exhaust fumes. This material also has the required rigidity to stand up in place without the need for extra wire mesh support or the like. Other filter media may also be suitable, provided they provide reasonable filtering without excessive flow reduction. The preferred dimensions of the filter media are to have pleats of between one centimetre and three centimeters with two centimetres being most preferred. The number of pleats and the spacing can be varied, depending upon the porosity of the filter material. The preferred height is about four to about ten centimeters. Of course, the filter is sized and shaped it fit inside the turbine-fan without interfering with it. It's most preferred to have the sides of the pleats spaced about five millimeters away from the blades of the turbine fan. This is to accommodate out of round blades, but may be reduced or enlarged, depending upon the manufacturing tolerances of the turbine fan. By being located in close proximity to the blades of the turbine fan 62, the flow through for filter 16 is believed to be improved.

It can now be appreciated that by locating the filter inside the turbine fan cavity, and by forming if from pleated material, a large surface area can be positioned in a very small space. For example, a filter which is directly across the air flow, even with pleats, would have a surface area of approximately 150 square cm. A 9 cm diameter raised pleated filter with 2.5 mm apart pleat spacings and individual pleat depths of 2 cm, would have a surface area of 1932 $cm^2$, if it were 6 cm high. If this was raised to 8 or 9 cms, the area would be even greater. The advantage of this is that by increasing the amount of filter surface area, the length of time the filter will remain effective will be extended and the filter will not have to be changed so often.

Figure 12:
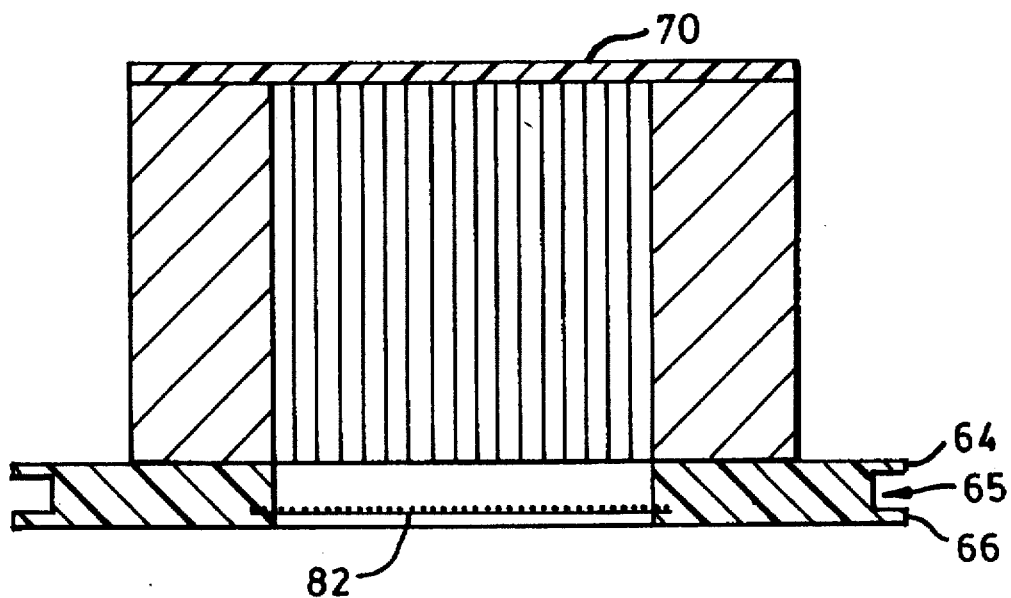
FIG. 12 is section of an alternate embodiment of a one piece device according to the present invention.

It is contemplated that the air filtering device may be either a single part or a two-part construction. In a single part construction, (which is preferred for ease of manufacturing) the air filter 16 would be permanently attached or molded to the bottom base unit 12. The preferred form is for the lower portion or foot 74 to be formed as a single integral element with molded in lips 64, 66, as shown in FIG. 12.

Figure 4:
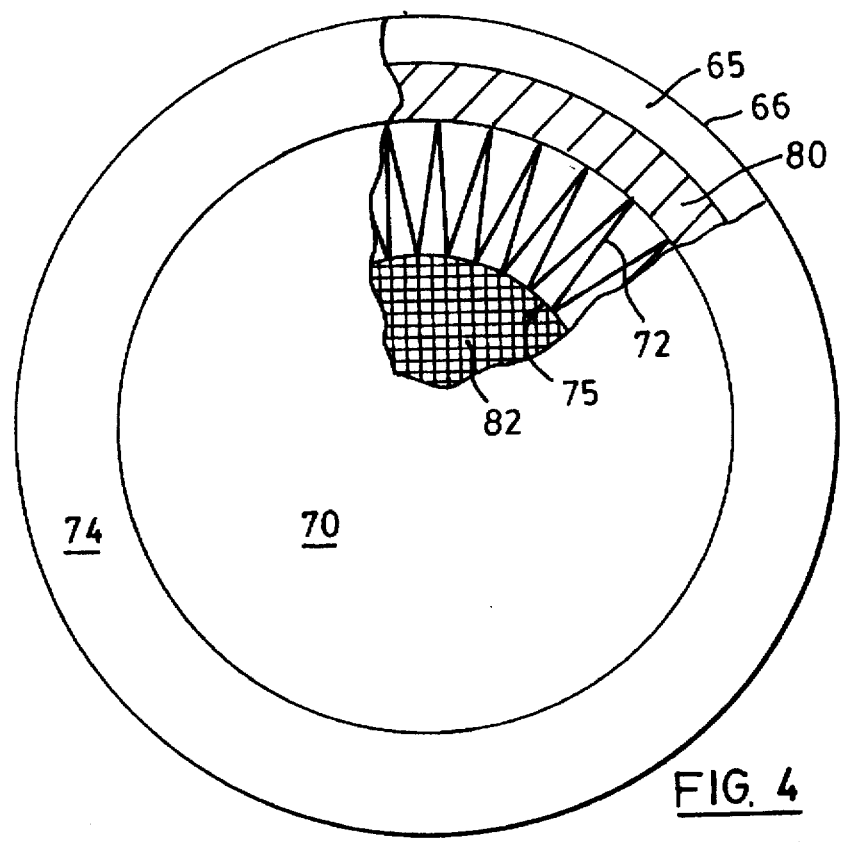
FIG. 4 is a top view of the air filtering device of FIG. 3.

Turning to FIG. 4, a top view of the present invention, in part section is shown. In FIG. 4, it can be seen that there is the lower mounting lip 66, a portion of the bottom base unit 12 shown as 80, the pleats 72 and the air intake inlet 75. In this embodiment, a screen 82 has been provided to cover central opening 75 to prevent the influx of leaves, paper or other blocking garbage. It is most preferred if the screen 82 is built into, and secured by the elastomeric foot 74. For example, an aluminum or typical clothing dryer screen can be integrally formed in the foot 74, to prevent leaves, paper, pine needles or other debris from entering the fresh air system. Other screen configurations are also possible however. It will also be appreciated that the size of the central opening 75 will vary, according to what thickness of pleat 72 is used. The thicker the pleats, the wider the foot 74 needs to be and the smaller the central opening 75 becomes.

Figure 5:
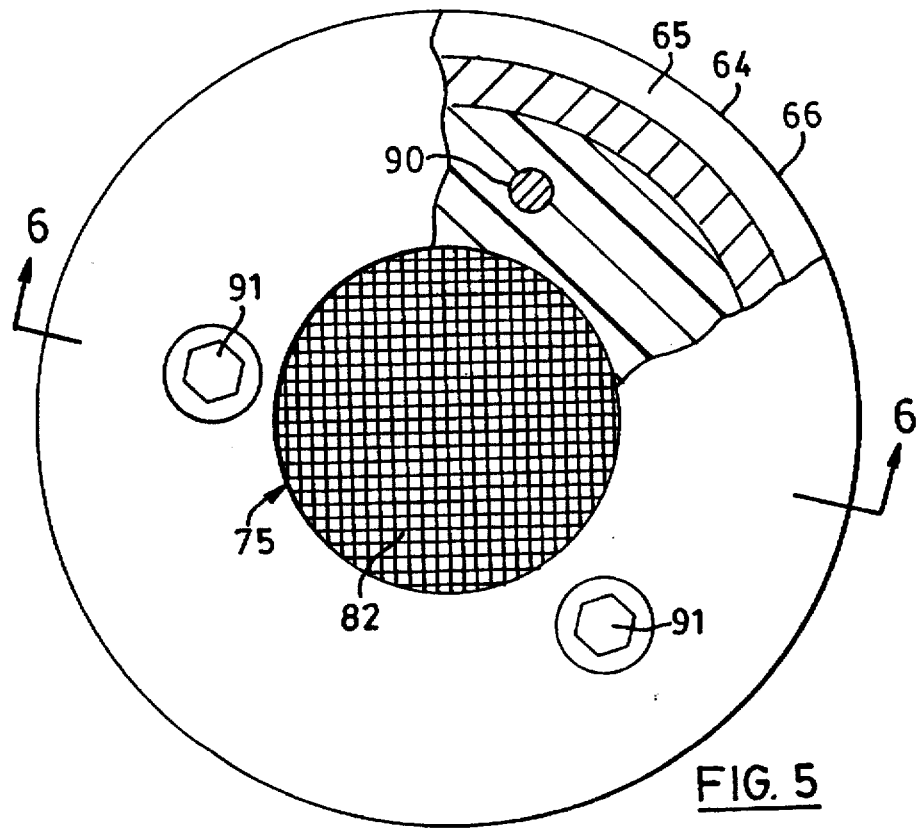
FIG. 5 is a bottom view of the air filtering device of FIG. 4.

A bottom view of a two-piece version of the invention is shown in FIG. 5. In this embodiment, screw bosses, an example of which is shown at 90, are formed in the foot 74 for threaded fasteners such as screws 91. In the preferred form three screws are used, but fewer or more screws could also give satisfactory results. In this manner, the air filter 16 may be simply and easily removed from the bottom base unit 12 and replaced when clogged with dirt, dust, pollutants and the like.

Figure 6:
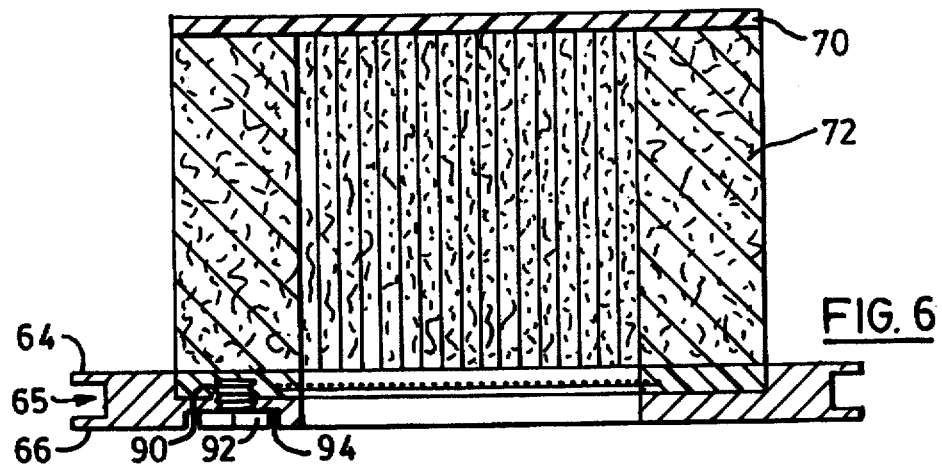
FIG. 6 is a cross-sectional view of the air filtering device of FIG. 5 along lines 6—6.

Turning to FIG. 6, a cross-sectional view along line 6—6 of FIG. 5 is shown. Again, the top portion 70 is shown with pleats 72. A screw 92 is shown in screw boss 90. It will be noted that a recess is formed at 94 to enable the bottom face of the mounting flange to be flush. This may be preferred for aesthetics or space requirements in some cases. For example, for vehicles with a recirculating feature in their fresh air systems, enacting the recirculating feature causes a valve to close, just below the upturned edge 68. To avoid compromising the action of this valve, the lower face of the present invention may have to be flush. Rather than using recessed bolt heads, as shown, other configurations such as socket headed fasteners might be used.

Figure 7:
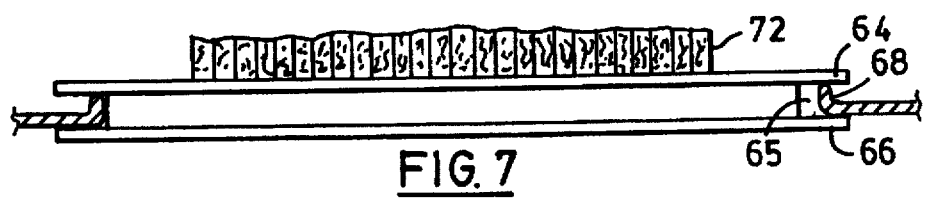
FIG. 7 is a side view showing the air filtering device of FIG. 1 in the installed position.
Figure 8:
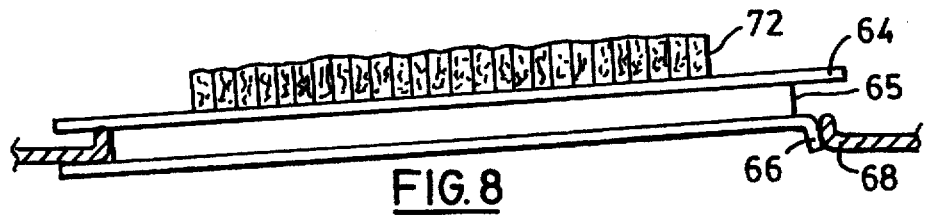
FIG. 8 is a view of the air filtering device in a partly removed position.
Figure 9:
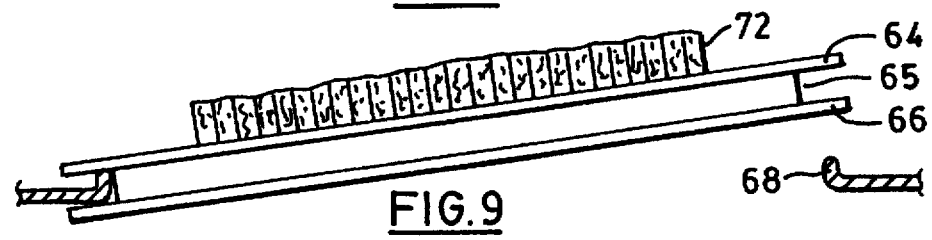
FIG. 9 is the air filtering device of FIG. 8 further removed.
Figure 10:
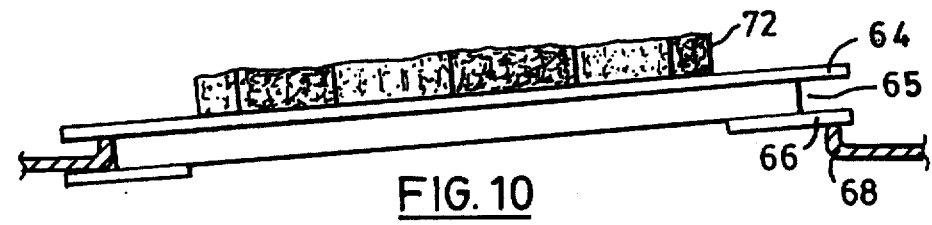
FIG. 10 is a second embodiment of the air filtering device being installed.

Turning now to FIGS. 7 through 11, the sequence of removal and insertion of the filter device 10 according to the present invention is shown. In FIG. 7, the filter device is shown mounted on the upturned lip or rim 68. FIG. 8, the mounting lip 66 is shown deflecting downwardly to allow the filter device to be removed. In FIG. 9, the mounting lip 66 has snapped back into position and the filter element may now be easily removed. In FIG. 10, an alternate embodiment of the filter device is shown. In this embodiment, there are fewer pleats 72 and additionally, the lip 66 is not continuous. Instead of being continuous, flanges are formed which only extend partially around the perimeter. It has been found that 2 or 3 flanges which cover approximately a third of the circumference of the perimeter of the bottom base unit 12 may provide reasonable results. Of course, the amount of mounting lips 64, 66 that is required is a function of both the size of the opening surrounded by the mounting lips 68 and the strength and consistency of the material forming the lips 66 and 64.

Figure 11:
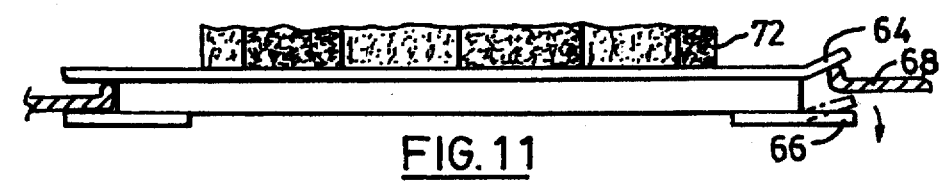
FIG. 11 is the second embodiment of FIG. 10 of the air filtering device almost completely installed.

In FIG. 11, the almost completely installed position is shown, with the mounting lip 64 being deflected upwardly sufficiently to allow the mounting lip 66 to deflect past the mounting lip 68. Each of the lips 64, 66 move independently of each other. Further, each of the lips is omnidirectional, in the sense that each lip can move up or down as required during mounting and demounting. Of course it is more important for the lip during insertion to be flexible, to snap over the edge 68. The leading lip will depend upon whether it is inserted from above or below and this will vary for different makes and models of cars. In some cases there is a removable cowl screen and the device 10 can be inserted from below without removing the blower motor assembly. The degree of deflection required will vary, depending upon the tolerances, and the distance, for example, between an inner face of groove 65 and the edge or rim 68.

It will now be appreciated that by forming the mounting lips 64, 66 from a flexible elastomeric or rubber material, the instant invention comprehends that the air filter device 10 may be mounted in a number of different vehicles without necessarily being changed in shape or size. In addition, all that is required to install the instant invention is to remove the mounting bolts which retain the blower 26, in place, remove the blower 26 and turbine fan 62 from its housing, install the mounting flange 14 with air filter 16 onto the upturned edge 68, and replace the blower 26. Thereafter, the blower 26 when engaged will draw fresh air across the filter, and then circulate the same throughout the vehicle's internal air system. By use of this air filter therefore noxious smells, together with particulate pollution such as dust, pollen and the like, can be prevented from entering into the vehicle air system, while still providing adequate oxygen to the occupants of the vehicle.

The preferred size of the upper lip 64 in order to fit nicely below the fan blades, is 1.3 mm or less in thickness, with a smooth upper surface. Any greater thickness would lead to interference between the upper lip 64 and the fan, causing friction, and excessive wear on the blower motor. In some cases, the blower 26 will be located inside the car, rather than under the hood, but in such case the procedures would be the same, namely, remove the blower 26 and install the air filter below. The air filter device is to be mounted and sealed to the fresh air intake conduit 68 by the mounting lips 64, 66.

It will be further appreciated by those skilled in the art that the present invention allows for a simple easily replaceable filter which may be removed when it gets clogged with dirt, pollutants and the like. The indication that the filter needs to be replaced will be the presence of odours and the like in the interior ventilated space of the care or a loss of air movement from the interior vents. Because the air filter is placed inside the turbine fan 62 of the blower motor assembly 26 in the ventilation system, the air filter will not cause a too significant drop in air pressure in the system. Further, by being closely spaced to the turbine fan, it will reduce the air speed loss. Of course, another feature of the instant invention is the use of pleats, and a relatively large height, which has the effect of increasing the surface area of the filter. This reduces the air pressure loss, and also increases the length of time that may pass prior to needing to replace the filter. In some cases it may be desirable to replace the blower 26 with a stronger one and with one that does not have a downward extension 60 as shown to maximize the height and surface area of the filter. Also the height of the turbine fans may be increased to allow more the height of the filter to be increased. This would enable even more filter material (i.e. area) to be incorporated. However, in either case the present invention provides a large area filter in the existing fresh air intake system of most vehicles, without needing any factory redesigned ducts conduits or plenums. In this sense the present invention is an easy retrofit into existing equipment.

Figure 13:
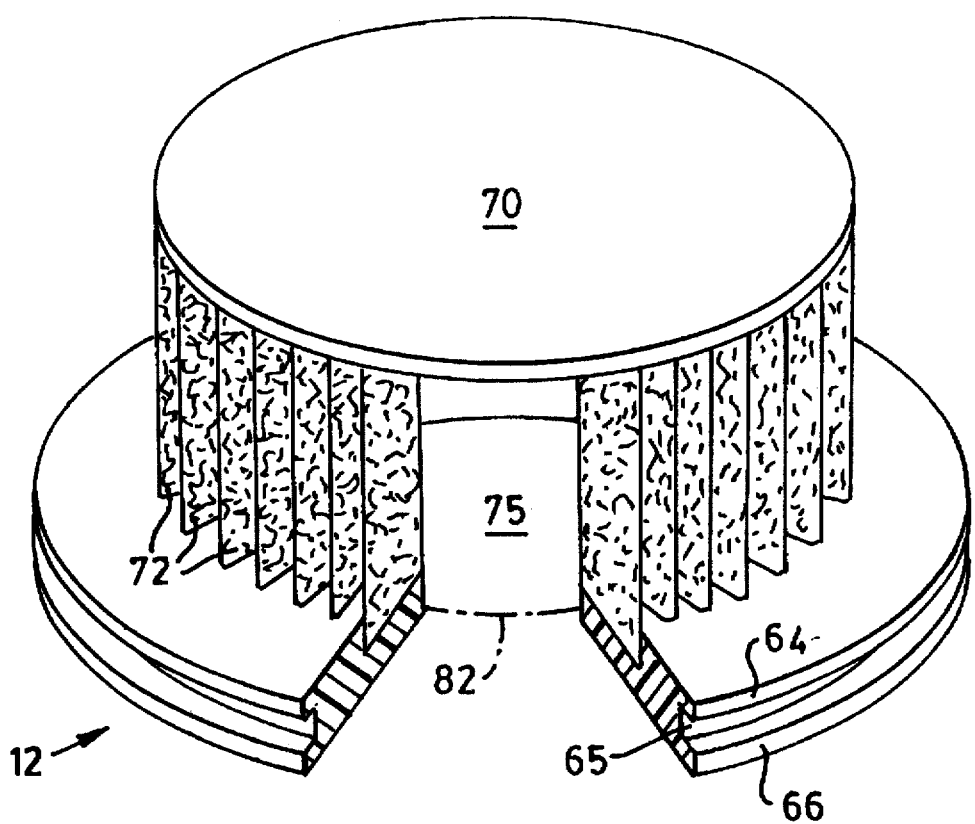
FIG. 13 is a perspective view of the embodiment of FIG. 12 in part section.

It will also be appreciated that the preferred form of the invention as described above comprehends the filter element being removable from the bottom base unit. It is also appropriate to have a one piece device, such as is illustrated in FIGS. 12 and 13. The sealing lips 64, 66 are still required to allow the filter to be sealed in conduits of different sizes and configurations, but may be integrally molded into the foot as shown. This one piece design is preferred for ease of manufacture. It is essentially the same except that there are no screws or screw bosses. Screen 82 is shown in dotted outline.

It will be appreciated to those skilled in the art that while reference has been made in the foregoing to the preferred embodiments of the invention other modifications may be made without departing from the broad scope of the claims that follow. For example, while reference is made to flexible rubber, other flexible materials whether natural or artificial may be used to achieve the same flexible mounting of the bottom base unit 12 on the mounting edge 68. Further, the dimensions could be varied from those cited above provided that the objectives were obtained. For example, what is desired is for the top hat filter of the present invention to fit generally in the space provided within the turbine fan cavity in a conventional vehicle construction. In this manner, the filter can be easily installed and yet provides a large surface area for filtration which will reduce the pressure loss across the filter. In this manner, the filter can be used for a considerably period of time before being replaced as being clogged or blocked.

I claim:

1. An air filtering device for inserting into a fresh air intake conduit for providing fresh air to occupants of a vehicle, where the conduit includes a generally circular rim extending around the perimeter of the conduit from an inside face of said conduit, said air filter device comprising:

a generally circular bottom base unit, said bottom base unit including a perimeter mounting portion to allow said bottom base unit to be retained in said air conduit, said perimeter mounting portion comprised of opposed outwardly extending mounting lips separated by an outwardly opening mounting groove, said mounting lips being resiliently flexible to mount over said rim and sufficiently stiff to retain said air filter device in position on said rim, said bottom base unit including air filter mounting means an air filter retained in said air filter mounting means of said bottom base unit, said air filter being sized and shaped to be inserted into a cavity located within a turbine fan of a blower motor assembly; and a central air intake inlet in said bottom base unit, said central air intake inlet including a screen mounted thereacross for preventing large debris from entering the air filter;

wherein said device is mountable in standard air circulation ducting of a vehicle by retaining said generally circular rim in said mounting groove without the need to modify said air circulation ducting.

2. The air filter device of claim 1 wherein said air filter device is an integrally formed one piece device.

3. The air filtering device of claim 1 wherein said device is a two piece device and said air filter mounting means includes removable fasteners to permit said air filter to be changed.

4. The air filtering device as claimed in claim 2 wherein air filter is in the form of sheet material and includes a plurality of pleats to increase the surface area, the pleats being located around the perimeter of the device.

5. The air filtering device of claim 1 wherein said air filter is provided with a top face, said top face being formed from filter material.

6. The air filtering device of claim 1 further including a central air intake inlet, and wherein the screen is integrally formed with said air filter.

7. The air filtering device of claim 6 wherein said air filter is comprised of an elastomeric foot secured to one end of the pleats and an impervious top surface secured to the other end of the pleats wherein the pleats are retained therebetween.

8. The air filtering device of claim 7 wherein said pleats form an unsupported free standing perimeter wall through which air may pass.

9. The air filtering device of claim 4 wherein the elastomeric foot is provided with one or more threaded bosses for retaining a threaded fastener therein.

10. The air filtering device of claim 1 wherein said upper mounting lip is sized and shaped to fit onto said rim and yet below a fan in said blower.

11. The air filtering device of claim 9 wherein said air filter is provided with generally upright pleated, air permeable side wall, and a generally impervious top.

12. An air filter device for inserting into a fresh air intake conduit for providing fresh air to occupants of a vehicle, where the conduit includes a generally circular rim extending around the perimeter of the conduit from an inside face of said conduit, said air filter device comprising:

a generally circular bottom base unit, said bottom base unit including a perimeter mounting portion to allow said bottom base unit to be retained in said air conduit, said perimeter mounting portion comprised of opposed outwardly extending upper and lower mounting lips separated by a outwardly opening mounting groove, said upper mounting lip being sized and shaped to fit onto said rim and yet below a fan in said blower, said mounting lips being resiliently flexible to mount over said rim and sufficiently stiff to retain said air filter device in position on said rim;

said bottom base unit including air filter mounting means; and an air filter retained in said air filter mounting means of said bottom base unit, said air filter being sized and shaped to be inserted into a cavity located within a turbine fan of a blower motor assembly wherein said device is mountable in standard air circulation ducting of a vehicle by retaining said generally circular rim in said mounting groove without the need to modify said air circulation ducting.

13. The air filter device of claim 12 wherein said air filter device is an integrally formed one piece device.

14. The air filtering device of claim 13 wherein said device is a two piece device and said air filter mounting means includes removable fasteners to permit said air filter to be changed.

15. The air filtering device as claimed in claim 14 wherein air filter is in the form of sheet material and includes a plurality of pleats to increase the surface area, the pleats being located around the perimeter of the device.

16. The air filter device of claim 15 further including a central air intake inlet, and further including a screen thereacross for preventing large debris from entering the air filter.

17. The air filter device of claim 16 wherein the screen is integrally formed with said air filter.

18. The air filtering device of claim 17 wherein said air filter is comprised of an elastomeric foot secured to one end of the pleats and an impervious top surface secured to the other end of the pleats wherein the pleats are retained therebetween.

19. The air filtering device of claim 18 wherein said pleats form an unsupported free standing perimeter wall through which air may pass.

20. The air filtering device of claim 15 wherein the elastomeric foot is provided with one or more threaded bosses for retaining a threaded fastener therein.

21. The air filtering device of claim 20 wherein said air filter is provided with generally upright pleated, air permeable side wall, and a generally impervious top.

22. The air filtering device of claim 1 wherein said air filter includes a top face, and said top face is formed from filter material.

* * * * *